United States Patent [19]
Kennemer

[11] Patent Number: 5,520,417
[45] Date of Patent: May 28, 1996

[54] RETROREFLECTIVE ANIMAL IDENTIFICATION TAG

[76] Inventor: Michael S. Kennemer, R.R. 2, Box 123A, Dill City, Okla. 73641

[21] Appl. No.: 295,933

[22] Filed: Aug. 25, 1994

[51] Int. Cl.$^6$ .................................................. B24D 15/00
[52] U.S. Cl. .................................. 283/74; 283/75; 283/91
[58] Field of Search .................................. 283/74, 75, 91, 283/101; 40/300, 301, 302, 303, 304

[56] References Cited

U.S. PATENT DOCUMENTS

| | | | |
|---|---|---|---|
| 2,397,272 | 3/1946 | Land | 283/91 X |
| 2,441,002 | 5/1948 | Berglund | 283/75 X |
| 2,954,631 | 10/1960 | McMurray | 40/300 |
| 3,994,560 | 11/1976 | Rice | 350/98 |
| 4,112,603 | 9/1978 | Giulie | 40/2 R |
| 4,226,036 | 10/1980 | Krug | 283/75 X |
| 4,377,988 | 3/1983 | Tung et al. | 119/106 |
| 4,471,546 | 9/1984 | Bolling, Jr. | 40/301 |
| 4,574,742 | 3/1986 | Morgan, Jr. | 119/156 |
| 4,842,304 | 6/1989 | Jones | 283/81 |
| 4,984,683 | 1/1991 | Eller | 283/75 X |

OTHER PUBLICATIONS

Warranty for Scotchlite Diamond Grade Conspicuity Sheeting Series 980 Revised Jul. 1993 and eff after that date.
Product Bulletin 980, Dated Jun. 1994.
Instruction Bulletin 5.13, Dated Sep., 1991.

*Primary Examiner*—Willmon Fridie, Jr.
*Attorney, Agent, or Firm*—Robert Treece

[57] ABSTRACT

A retroreflective animal tag, such as an ear tag or the like, which has a reflective surface with wide angularity and high reflectivity.

12 Claims, 1 Drawing Sheet

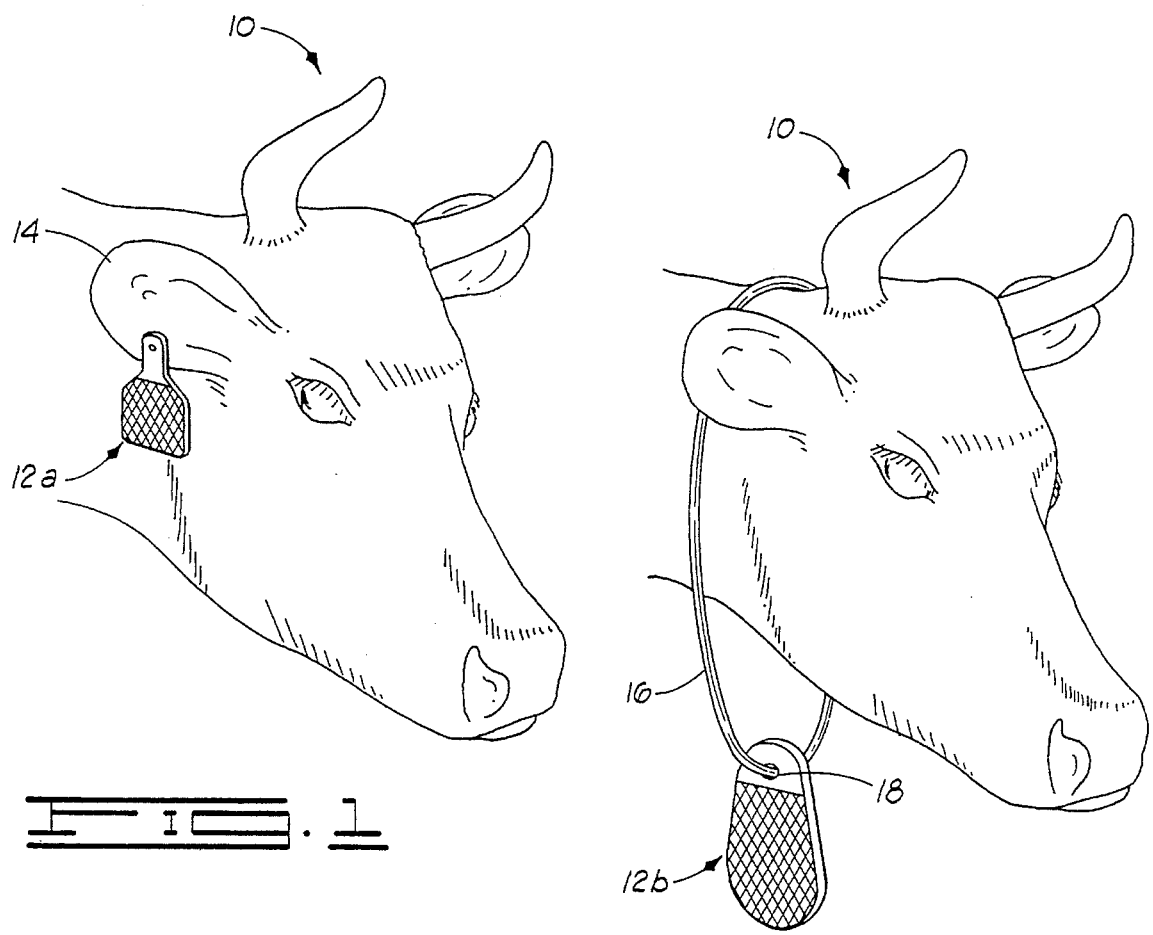
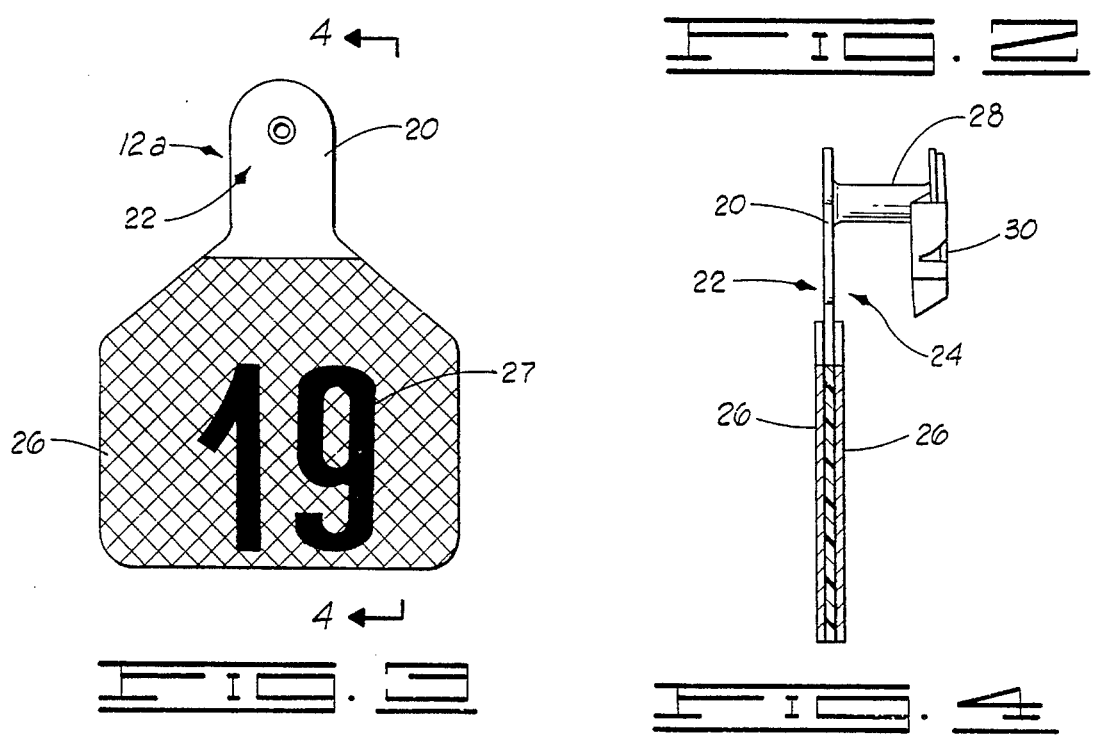

5,520,417

RETROREFLECTIVE ANIMAL IDENTIFICATION TAG

FIELD OF THE INVENTION

The present invention relates to animal identification tags, and more particularly to a retroreflective tag which may be used as an identification and warning device.

SUMMARY OF THE INVENTION

Animal identification tags have commonly been used to distinguish one animal from another or to identify the owner of a particular animal. However, prior to this invention animal tags have not been considered a safety device.

A common and highly dangerous condition occurs when an animal wanders into the path of a vehicle especially under low lighting conditions. While animals are generally penned, tethered, or fenced in, it is not uncommon for an animal to wander onto a road. Even with careful attention to detail it is difficult at best to keep animals such as cattle or horses from occasionally escaping onto a road. If an animal is hit by a vehicle, often serious injury to either the animal, vehicle or the vehicle driver occurs. Animal tags currently available do not provide sufficient reflectivity over a sufficient range of angles to warn the driver of a vehicle that an animal is in the path of travel.

The current invention provides a animal tag with a highly reflective surface over a broad range of angles which, not only makes it easer to read information on the tag but also provides a warning reflector in case the animal should wander into the path of an oncoming vehicle. When the light from a vehicle's headlight strikes the retroreflective animal tag the light is reflected back to the driver, and thus, warns the driver that the animal is in the path of travel.

BRIEF DESCRIPTION OF THE DRAWINGS

FIG. 1 is a perspective view of a cow wearing an ear tag constructed in accordance with the present invention.

FIG. 2 is a perspective view of a cow wearing a neck tag constructed in accordance with the present invention FIG. 3 is a front view of an ear tag constructed in accordance with the present invention.

FIG. 4 is a cross sectional view of the ear tag of FIG. 4.

DETAILED DESCRIPTION OF THE PREFERRED EMBODIMENTS

Referring to the drawings in detail and to FIG. 1 in particular, reference character 10 generally designates an animal wearing a retroreflective ear tag 12a constructed in accordance with the present invention. The ear tag 12a is attached to the ear 14 of an animal such as cow 10.

The figures illustrate the use of the retroreflective tag of this invention with a cow since it is a common domestic animal for which the invention may be used. However, the present invention may be used with any domestic or wild animal, including but not limited to: pigs, horses, mules, sheep, goats, cats, dogs, deer, zebras or any other animal which can be tagged for identification or warning purposes.

A neck tag 12b is illustrated in FIG. 2 as it may be used with a cow 10. The neck tag 12b may be attached to an animal by a necklace 16 made from cable, chain, rope or other materials which are common in the art. Preferably the neck tag 12b includes an aperture 18 for receiving or mounting the neck tag on the necklace 16. However, the neck tag may utilize other mounting means such as clips, snaps, hooks, or other means. The present invention also includes other types of tags or surfaces which are commonly attached to animals. For example, the tag may be a plate which may be attached to a halter, or bridal, (hereinafter collectively referred to as a halter tag) or a tail tag which may be attached to the tail of an animal (an example of which is disclosed in U.S. Pat. No. 4,574,742, which is specifically incorporated herein by reference).

The retroreflective ear tag 12a of FIG. 3 is a typical embodiment of the invention. The ear tag 12a includes a base 20 preferably made out of a flexible, but shape sustaining material such as plastic or rubber. Tags commonly used with animals are generally plainer and have a front 22 and a rear 24 (FIG. 4.). When the tag is generally plainer, a retroreflective surface 26 may be on the front 22, the rear 24 or to both the front and the rear 22 & 24 of the tag 12. When attached to the ear of an animal, a shaft 28 passes through the ear 14 of the animal and a keeper 30 holds the tag 12a in place.

The tag may also include more than two retroreflective surfaces. For example the tag may be in the shape of a tetrahedron or other shapes having three or more generally flat surfaces. In addition, the tag may have rounded surfaces such as a bell or cylinder.

While the retroreflective surface may be formed as part of the base, preferably the retroreflective surface is attached to the base with an adhesive, and the reflective surface should be resistant to oils, detergents, and water. Preferably the retroreflective sheeting consist of a smooth, flat, transparent exterior film with retroreflective elements embedded or suspended beneath the film so as to form a non-exposed retroreflective optical system.

To provide the most warning to vehicles and the clearest identification, the reflective surface should have a high brightness over a wide range of angeles, that is, it should have wide angularity, wherein the angularity refers to the angle between a line perpendicular to the plain of the reflective surface and the light source. This is particularly true when the tag has fewer than three generally flat retroreflective surfaces. In such cases, preferably the angularity should be at least 75°, and more preferably the angularity should be at least 80° and most preferably the angularity should be up to an angle between 80° to 90°. In the preferred embodiment the retroreflective surface should meet or exceed all of Federal Motor Vehicle Safety Standard (FMVSS) 108 requirements for retroreflective sheeting as they exist on the filing date of this application. The FMVSS 108 requirements are specifically incorporated by reference herein.

Preferably the coefficient of retroreflection for the retroreflective sheeting, for a white surface, should be at least 250 candlepower per foot-candle per square foot with an observation angle of 0.2° and an entrance angle of −4°, and more preferably the coefficient of retroreflection should be between 250 and 900 candlepower per foot-candle per square foot, and most preferably the coefficient of retroreflection is greater than 900 candlepower per foot-candle per square foot. For a colored retroreflective surface 26, such as a red surface, preferably the coefficient of retroreflection should be at least 60 candlepower per foot-candle per square foot with an observation angle of 0.2° and an entrance angle of −4°, and more preferably the coefficient of retroreflection should be between 60 and 162 candlepower per foot-candle per square foot, and most preferably the coefficient of retroreflection is greater than 162 candlepower per footcandle per square foot.

When the tag has three or more retroreflective surfaces the angularity preferably is sufficient to provide a full 360° reflectivity. For example if the tag were cubical in shape an angularity of 45° would provide 360° reflectivity.

One suitable retroreflective surface material is SCOTCHLITE™ Diamond Grade Conspicuity Sheeting series 980 which is further described in 3M, Product Bulletin 980, June 1994; and 3M, Instruction Bulletin 5.13, Sep. 1991, both of which are specifically incorporated herein by reference. Another suitable retroreflective surface material is made by the Truck-Lite Co., Inc. of Falconer, N.Y. Other retroreflective surfaces which may be suitable are commonly known in the vehicle safety art.

In one embodiment of the invention a kit is provided for converting existing animal tags into retroreflective warning tags. When the kit is used, the existing tag becomes the tag base 20 for the retroreflective tag. The kit includes sheets of retroreflective material having an adhesive backing. The reflective material should include a pull-off liner to protect the adhesive until application. Preferably the sheeting is pre-cut to a size and shape generally equal to, or less than, the size of a surface on the tag base. More preferably the reflective sheeting is cut to a size and shape so that the front and rear surface of a tag base may be covered with a single piece of sheeting.

Identification characters such as alphanumeric characters, designs or logo's, may be added to the retroreflective tag by attaching characters 27 to the retroreflective surface or by cutting out the shape of the characters 27 in the retroreflective surface. When the characters 27 are cut out of the retroreflective surface and then surface is attached to the base, portions of the base will show through the cutouts to reveal the desired character. When this method is used it is preferable for the tag base to be a contrasting color and/or non-reflecting. Preferably the retroreflective sheeting kit includes pre-cut characters of reflective material of a contrasting color which may be secured over the tag's retroreflective surface. In this way, when a character is secured to the tag over the retroreflective sheeting, the character will show up as a different color than the tag.

In a second embodiment of the invention, retroreflective tags are provided with the retroreflective surface already in place on the tag base and characters may also be included on the tag. The characters may be either cutouts in the retroreflective surface so that the tag base shows, or may be painted, printed, or affixed to the retroreflective surface.

When the present invention is used with a halter or bridal having straps, the retroreflective tag is preferably attached like a label plate to one or more of the straps or at the connection point for two or more of the straps.

In operation, a retroreflective tag such as an ear tag is attached to the animal by conventional means, then if the animal is in the path of a vehicle the lights from the vehicle will be reflected back to the driver of the vehicle. Preferably two ear tags, or halter tags are use to provide the widest range of angles from which a retroreflective tag will be visible. Additionally a tail tag may be used in combination with ear tag(s), halter tag(s) or a neck tag to increase the visibility of the animal.

Changes may be made in the combinations, operations and arrangements of the various parts and elements described herein without departing from the spirit and scope of the invention as defined in the following claims.

I claim:

1. A retroreflective warning animal tag for reflecting light from a headlight on a vehicle to a driver in the vehicle, comprising:

a tag base with at least one retroreflective surface secured thereto;

a shaft attached to the tag base for passing through an animals ear;

a keeper attached to the shaft to hold the shaft in the animals ear and wherein the retroreflective surface has a minimum photometric performance of 30 candlepower per foot-candle per square foot at an observation angle of 0.02 degrees and entrance angle of −4 degrees.

2. The retroreflective warning animal tag of claim 1 wherein the retroreflective covering has a minimum photometric performance of 60 candlepower per foot-candle per square foot at an observation angle of 0.02 degrees and entrance angle of −4 degrees.

3. The retroreflective warning animal tag of claim 1 wherein the retroreflective surface has one or more apertures therein in the shape of an identification character.

4. The retroreflective warning animal tag of claim 1 having two or more generally flat retroreflective surfaces.

5. The retroreflective warning animal tag of claim 1 wherein the retroreflective surface has an angularity of at least 75°.

6. The retroreflective warning animal tag of claim 1 wherein the retroreflective surface has an angularity of at least 80°.

7. The retroreflective warning animal tag of claim 1 wherein the retroreflective surface is secured to the base with an adhesive.

8. The retroreflective warning animal tag of claim 1 further comprising: reflective characters for attaching over the retroreflective surface wherein the characters have an adhesive backing for attaching characters to the retroreflective surface.

9. A kit for making a retroreflective warning animal tag from an existing animal tag comprising:

a retroreflective covering having an adhesive back for attaching to an existing animal tag, wherein the retroreflective covering is pre-cut to a size and shape for attachment to at least one surface on the existing animal tag and wherein the retroreflective covering has a minimum photometric performance of 30 candlepower per foot-candle per square foot at an observation angle of 0.02 degrees and entrance angle of −4 degrees.

10. The kit of claim 9 wherein the retroreflective covering has one or more apertures therein to reveal an identification character.

11. The kit of claim 7 wherein the retroreflective surface has an angularity of at least 75°.

12. A retroreflective warning animal tag for reflecting light from a headlight on a vehicle to a driver in the vehicle, comprising: a tag base for attaching to an animal and at least one retroreflective surface secured to the tag base wherein the retroreflective surface has a minimum photometric performance of 30 candlepower per foot-candle per square foot at an observation angle of 0.02 degrees and entrance angle of −4 degrees; and wherein the retroreflective surface is secured to the base with an adhesive.

* * * * *